(No Model.)
O. A. DIECKMANN & K. KOLLENBERG.
SHOE WITH REMOVABLE CALKS.
No. 539,611. Patented May 21, 1895.
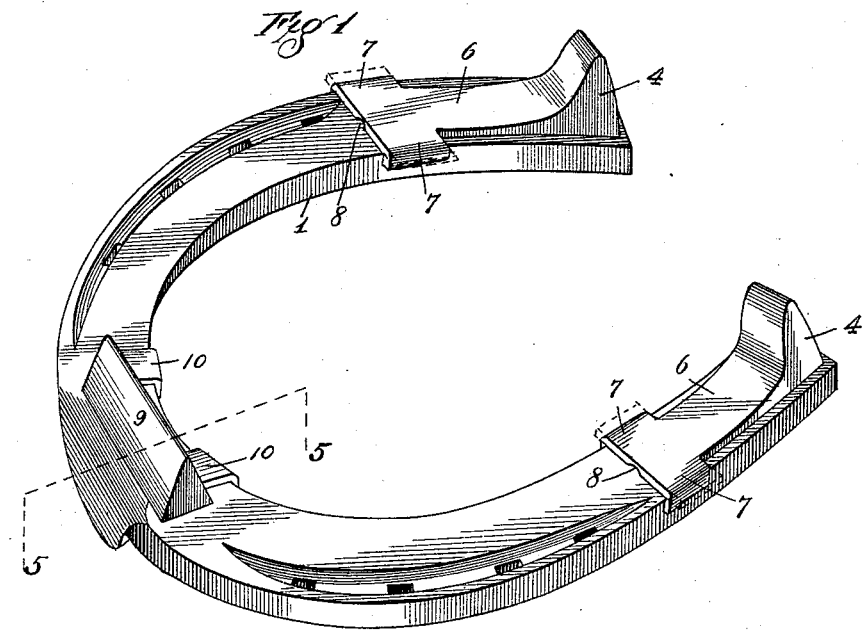
Attest
John L. Gunison
M. P. Smith
Inventors
Otto Anton Dieckmann
Kaspar Kollenberg
By Higdon & Higdon & Longan, Attys.

UNITED STATES PATENT OFFICE.

OTTO A. DIECKMANN AND KASPAR KOLLENBERG, OF ST. LOUIS, MISSOURI.

SHOE WITH REMOVABLE CALKS.

SPECIFICATION forming part of Letters Patent No. 539,611, dated May 21, 1895.

Application filed January 14, 1895. Serial No. 534,728. (No model.)

*To all whom it may concern:*

Be it known that we, OTTO ANTON DIECKMANN and KASPAR KOLLENBERG, of the city of St. Louis and State of Missouri, have invented certain new and useful Improvements in Horseshoes, of which the following is a full, clear, and exact description, reference being had to the accompanying drawings, forming a part hereof.

Our invention relates to an improved horse shoe, and it consists in the novel arrangement and combination of parts, hereinafter specified and claimed.

The object of our invention is to construct a horse shoe with removable toe and heel-calks, the same possessing superior advantages in point of simplicity, durability and general efficiency.

In the drawings, Figure 1 is a view in perspective of a horseshoe constructed in accordance with our invention. Fig. 2 is a detail view of a portion of a horseshoe, the same having a calk in position thereon, a portion of the horseshoe being broken away to more clearly illustrate the device. Fig. 3 is a view in perspective of one of the removable heel-calks. Fig. 4 is a view in perspective of the removable toe-calk as contemplated by our invention. Fig. 5 is a sectional view taken approximately on the indicated line 5 5 of Fig. 1.

1 indicates a horse shoe of the ordinary form and construction, the same being provided in each of the heel-points with screw-threaded apertures 2. A similar screw-threaded aperture 3 is located at that point of the horse shoe where the toe-calk is usually located.

The heel-calk 4 is V-shaped in cross-section and constructed with a screw-threaded lug 5 that is adapted to enter the screw-threaded bores or apertures 2. Formed integral with and extending at right angles to the base of the calk 4 is a spring-arm 6, the same being provided at its end with lateral projections 7. In the end of the spring-arm 6 between the lateral projection 7 is formed a notch or depression 8, the purpose of which will be presently shown.

The toe-calk 9 is V-shaped in cross-section and provided on one side with the integral laterally projecting spring-arms 10 formed integral with the under side of the calk 9, and projecting therefrom is a screw-threaded lug 11 that is adapted to enter the screw-threaded aperture 3 located in the toe of the shoe 1.

In positioning the heel-calks upon the rear ends of the shoe 1, the screw-threaded lugs 5 are positioned in the screw-threaded apertures 2 and the calk so manipulated as that the faces of said calk and the spring-arm 6 engage with the face of the shoe. When the calk is in this position, and the spring-arm 6 lies along the face of the shoe 1, the laterally projecting portions 7 that extend beyond the edges of the heel-ends of the shoe are upset or bent at right angles to the spring-arm 6, as clearly illustrated by solid lines in Fig. 1 and by dotted lines in Fig. 3. This manner of locating the calk upon the shoe serves to rigidly fix said calk and to efficiently prevent the same from being turned while the shoe is in use upon an animal's hoof.

When it is desired to remove either one of the heel-calks for the purpose of sharpening, straightening or lengthening the same, a pointed tool of any kind is inserted in the notch 8 on the rear under side of the spring-arm 6, and said arm raised or pried upwardly until the ends 7 are free to pass over the face of the heel-point of the shoe. By now unscrewing the calk 4 the same may be quickly removed from the shoe. Another manner of removing the heel-calks is to straighten or flatten out the laterally projecting portions 7 by means of a hammer or like tool, which will allow the calk to be removed without necessitating the prying up or raising of the spring-arm 6 from the heel-point of the shoe.

The toe-calk 9 is positioned upon the toe of the shoe by locating the screw-threaded lug 11 in the screw-threaded aperture 3 and manipulating said toe-calk until it engages against the under face of the toe of the shoe. The ends of the lateral projections 10 are now bent at right angles to the body portions of said projections until they engage with the inner edges of the shoe, thus rigidly fixing said calk and preventing the same from turning, unscrewing and losing when the shoe is in position upon the hoof of the animal. When it is desired to remove this toe-calk, the bent ends of the laterally projecting portions 10 are bent into a plane with the bodies of said laterally projecting portions which will allow the calk 9 to be unscrewed and removed from the shoe.

Thus it will be seen how we have constructed a horse shoe with removable calks, the same being quickly and efficiently fixed to the shoe, and which may be when desired, expeditiously and easily removed. A horse shoe so constructed is inexpensive, efficient and of longer life than is a shoe of the ordinary construction.

What we claim is—

1. A horseshoe constructed with removable heel and toe calks, said calks being provided with integral screw-threaded lugs adapted to enter screw-threaded apertures in the shoe, said calks being also constructed with integral spring-arms, the ends of which are adapted to be bent at right angles to the body portions thereof to engage the edges of the shoe.

2. The combination of a horse shoe constructed with screw-threaded apertures in its heel-ends, and calks provided with screw-threaded lugs adapted to enter said screw-threaded apertures, and provided also with spring-arms, the laterally projecting ends of which are adapted to be bent so as to engage the edges of the shoe and prevent the calks from turning.

In testimony whereof we affix our signatures in presence of two witnesses.

OTTO A. DIECKMANN.
KASPAR KOLLENBERG.

Witnesses:
E. E. LONGAN,
JOHN C. HIGDON.